US006465388B1

(12) United States Patent
Hozumi et al.

(10) Patent No.: US 6,465,388 B1
(45) Date of Patent: Oct. 15, 2002

(54) PROCESS FOR FORMING A FILM WITH PHOTOCATALYTIC FUNCTION

(75) Inventors: Atsushi Hozumi; Hitotoshi Murase, both of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/626,658

(22) Filed: Jul. 27, 2000

(30) Foreign Application Priority Data

Jul. 30, 1999 (JP) .......................................... 11-216986

(51) Int. Cl.[7] ................................................ B01J 31/00

(52) U.S. Cl. .................. 502/159; 502/158; 502/527.12; 502/527.13; 427/412.1; 106/287.1; 106/287.19

(58) Field of Search ................................ 502/158, 159, 502/527.12, 527.13; 427/387, 393.5, 412.1, 493, 514, 515, 521, 553, 558; 106/287.1, 287.19; 204/157.15

(56) References Cited

U.S. PATENT DOCUMENTS 5,755,867 A 5/1998 Chikuni et al. ........ 106/287.16
5,770,314 A * 6/1998 Suga et al. ................. 428/412
5,783,260 A * 7/1998 Kato et al. .................. 427/493
6,048,910 A * 4/2000 Furuya et al. ................ 522/86
6,165,619 A * 12/2000 Ikenaga et al. ............. 428/448
6,228,796 B1 * 5/2001 Arakawa et al. ............ 502/159

FOREIGN PATENT DOCUMENTS

| | | | |
|---|---|---|---|
| JP | 10-067543 | * | 11/1996 |
| JP | 10-315374 | * | 2/1998 |
| JP | 10-67873 | | 3/1998 |
| JP | 10-338854 | * | 12/1998 |

* cited by examiner

*Primary Examiner*—Mark L. Bell
*Assistant Examiner*—Patricia L. Hailey
(74) *Attorney, Agent, or Firm*—Morgan & Finnegan, LLP

(57) ABSTRACT

A photocatalytic film is formed by: a step for forming an uncured underlayer from an organic composition on the surface of a resinous base and polymerizing the organic composition to convert the uncured underlayer into an underlayer having a hardness higher than that of the resinous base; a step for forming an uncured intermediate layer from a polymerizable and curable silicone composition on the uncured underlayer or on the underlayer to yield an uncured intermediate layer, and polymerizing the polymerizable and curable silicone composition to convert the uncured intermediate layer to an intermediate layer, the polymerizable and curable silicone composition being prepared mainly from a hydrolyzable tetrafunctional silane derivative; and a step for forming a photocatalytic layer on the intermediate layer. This process can form an intermediate layer having a very high hardness without cracking and can easily yield a photocatalytic film having a satisfactory abrasion resistance.

5 Claims, 2 Drawing Sheets

(R DONOTES $CH_3$, $C_2H_5$ AND THE LIKE.)

PROCESS FOR FORMING A FILM WITH PHOTOCATALYTIC FUNCTION

BACKGROUND OF THE INVENTION

1. Field of the Invention

The present invention relates to a process for forming a film having a photocatalytic function on the surface of a resinous base of, for example, a resinous article.

2. Description of the Related Art

Photocatalysts have photocatalytic activities for decomposing organic substances with the aid of light energy. When a film containing such a photocatalyst is formed on the surface of a resinous base and an organic substance is adhered to the surface of the film, the organic substance is decomposed by the photocatalyst and is thereby naturally removed.

However, if a film having a photocatalytic function (hereinafter referred to as "photocatalytic film") is directly formed on the surface of a resinous base, the photocatalytic film decomposes not only the organic substance adhered to its surface but also an interface of the resinous base in contact with the photocatalytic film. As a result, the interface of the resinous base is deteriorated and the photocatalytic film may be peeled off from the resinous base.

As a possible solution to this problem, a process for the formation of a photocatalytic film has been proposed including the steps of forming an underlayer from a paint composition, such as a polymerizable and curable silicone composition, that is not decomposed by a photocatalyst on the surface of a resinous base, and forming a photocatalytic layer containing the photocatalyst on the underlayer. In such a two-layer photocatalytic film composed of an underlayer and a photocatalytic layer, the underlayer can prevent the decomposition of the resinous base by action of the photocatalyst in the photocatalytic layer. Thus it can prevent deterioration of the interface of the resinous base in contact with the photocatalytic film and prevent the photocatalytic film from peeling off from the resinous base.

Such photocatalytic films are generally used in surroundings which are exposed to light, and are likely to be subjected to abrasion or frictional force from external sources. Photocatalytic films therefore often require a high abrasion resistance. A possible solution to impart abrasion to photocatalytic films is the formation of an underlayer having a high hardness.

For example, polymerizable and curable silicone compositions include silane derivatives. Such silane derivatives can be classified as tetrafunctional, trifunctional, and bifunctional silane derivatives, as shown in FIGS. 2A to 2C, according to the number of functional groups which can be involved in hydrolysis reaction. Of these three types of silane derivatives, use of a tetrafunctional silane derivative can increase the number of bonds involved in polymerization and can increase the hardness of the resulting underlayer.

However, if large amounts of a tetrafunctional silane derivative are used, the hardness of the resinous base and the underlayer differ greatly from one another. As a result, volume changes in the layers, which may occur during the formation or use of the photocatalytic film, differ greatly from one another to thereby cause cracks in the underlayer. This problem is indicated in Japanese Patent Laid-Open No. 9-227829. This publication describes that a content of a hydrolyzable tetrafunctional silane derivative in the film exceeding 30% by mole may invite cracking in the film.

As is described above, if the hardness of the underlayer is merely increased, the resinous base and the underlayer will have largely different hardnesses, and cracking is liable to occur in the underlayer. If such cracks are formed, the adhesion between the resinous base and the underlayer is deteriorated to thereby cause peeling of the photocatalytic film from the resinous base.

Separately, a process for the formation of a photocatalytic film has been proposed which includes the steps of forming an underlayer as a primer resin layer on the surface of a resinous base, forming an intermediate layer composed of a thermally polymerizable and curable silicone composition on the underlayer, and forming a photocatalytic layer containing a photocatalyst on the intermediate layer, as is disclosed in Japanese Patent Laid-Open No. 10-67873. In such a three-layer photocatalytic film composed of an underlayer, an intermediate layer, and a photocatalytic layer, the underlayer has satisfactory adhesion to the resinous base and to the intermediate layer, and the photocatalytic film can be sufficiently prevented from peeling off from the resinous base.

However, a resulting photocatalytic film obtained by such a conventional process for the formation of a three-layer photocatalytic film composed of an underlayer, an intermediate layer, and a photocatalytic layer still has insufficient abrasion resistance.

SUMMARY OF THE INVENTION

Accordingly, it is an object of the present invention to provide a process which is capable of easily forming a photocatalytic film having satisfactory adhesion with a resinous base and having a higher abrasion resistance than conventional photocatalytic films.

Specifically, the invention provides a process for the formation of a film with a photocatalytic function. The process including: an underlayer forming step for forming an uncured underlayer from an organic composition on a surface of a resinous base, and polymerizing the organic composition to convert the uncured underlayer into an underlayer having a hardness higher than that of the resinous base; an intermediate layer forming step for forming an uncured intermediate layer from a polymerizable and curable silicone composition on the uncured underlayer or on the underlayer to yield an uncured intermediate layer, and polymerizing the polymerizable and curable silicone composition to convert the uncured intermediate layer to an intermediate layer, the polymerizable and curable silicone composition being prepared mainly from a hydrolyzable tetrafunctional silane derivative; and a photocatalytic layer forming step for forming a photocatalytic layer including a photocatalyst on the intermediate layer.

In the underlayer forming step, an organic underlayer having satisfactory affinity (compatibility etc.) with the resinous base is formed. The formed underlayer therefore has satisfactory adhesion with the resinous base.

In the intermediate layer forming step, an intermediate layer is formed from a polymerizable and curable silicone composition prepared mainly from a hydrolyzable tetrafunctional silane derivative. Hence, the formed intermediate layer may have a very high hardness. This intermediate layer has a higher hardness than intermediate layers of conventional photocatalytic films and therefore can provide a higher abrasion resistance of the resulting photocatalytic film than conventional.

The intermediate layer is formed on the underlayer having a higher hardness than the resinous base. Specifically, as difference in hardness between the underlayer and the intermediate layer is smaller than that between the resinous base and the intermediate layer, it is difficult for cracking, due to a difference in hardness with the underlayer, to occur in the intermediate layer. The intermediate layer therefore has a satisfactory adhesion to the underlayer.

In addition, the intermediate layer is formed from a polymerizable and curable silicone composition that is not decomposed by the photocatalyst, and which is resistant to decomposition by the photocatalytic layer formed in the subsequent photocatalytic layer forming step.

Thus, a described above, according to the present invention it is possible to easily form a photocatalytic film having satisfactory adhesion with a resinous base and having a higher abrasion resistance than conventional. These advantages can be particularly effectively obtained when the resinous base has a relatively low hardness.

BRIEF DESCRIPTION OF THE DRAWINGS

Each of FIGS. 2A to 2C is a diagram showing a fundamental unit of silicone molecule prepared from different silane derivatives; in which.

DESCRIPTION OF THE PREFERRED EMBODIMENTS

Figure 1:
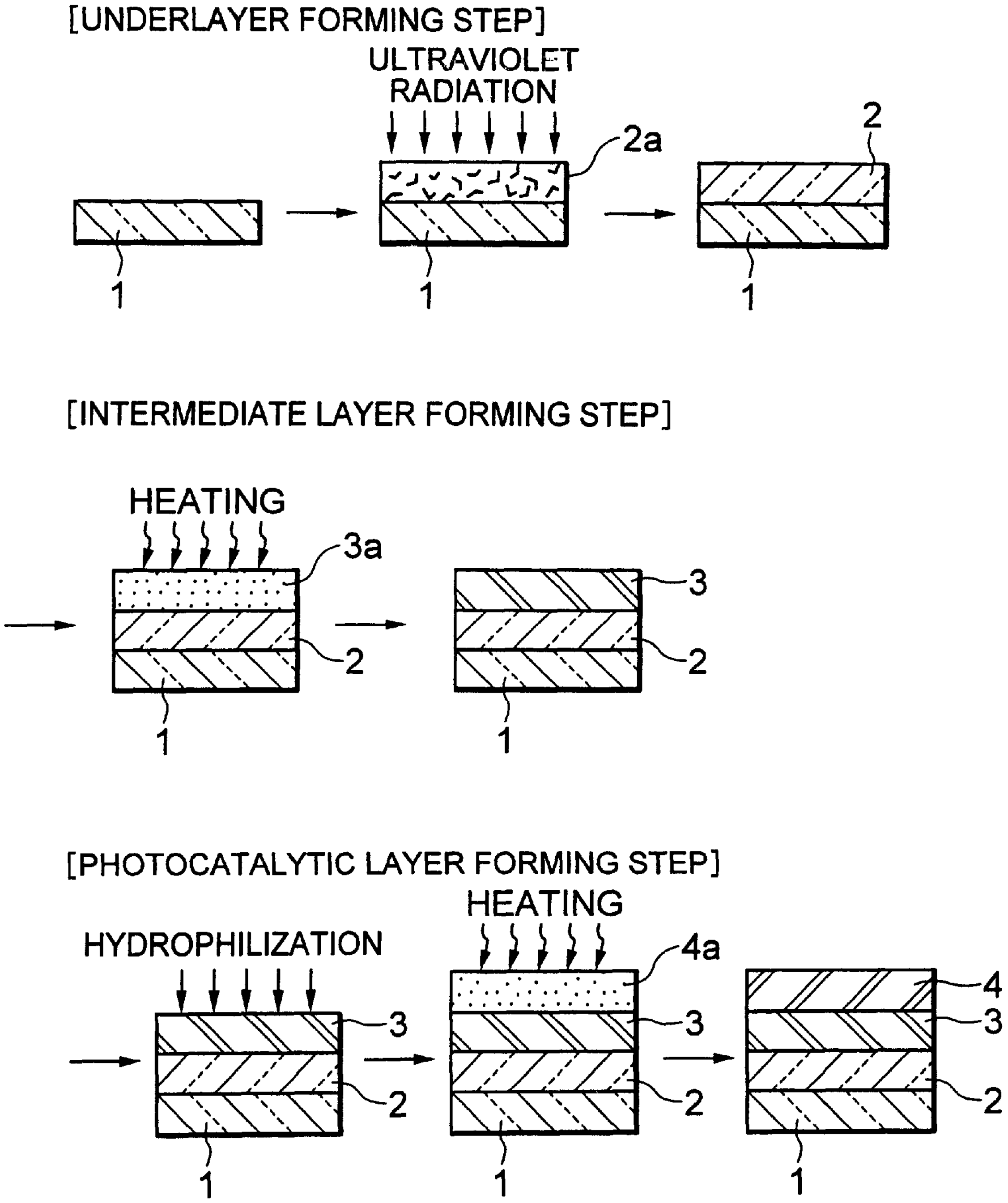
FIG. 1 is a schematic flow chart showing the flow of procedures in the formation of a photocatalytic film according to Example 1.
Figure 2A:
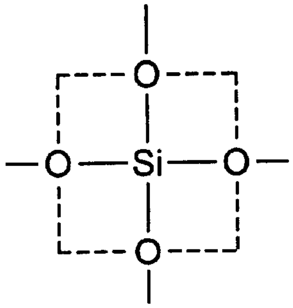
FIG. 2A shows the unit of a silane derivative prepared from a hydrolyzable tetrafunctional silane derivative.
Figure 2B:
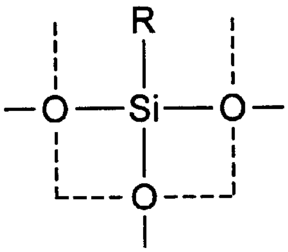
FIG. 2B shows the unit of a silane derivative prepared from a hydrolyzable trifunctional silane derivative.
Figure 2C:
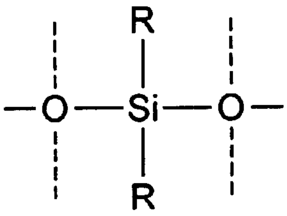
FIG. 2C shows the unit of a silane derivative prepared from a hydrolyzable bifunctional silane derivative. Moreover, in FIGS. 2B and 2C, R includes $CH_3$ and $C_2H_5$.

Embodiments of the present invention will now be described in detail for each step.

[Underlayer Forming Step]

The configuration and material of resinous bases used in the invention are not particularly limited. For example, a transparent base may be employed when applied to car windows, and an opaque base may be employed when applied to gear wheels. Such resinous bases may be made of, for example, acrylic resins, methacrylic resins, or polycarbonate resins.

An uncured underlayer may be formed by, for example, a process of preparing a liquid or paste mixture (first mixture) containing an organic composition, and applying a film of the first mixture onto the surface of a resinous base. The first mixture may further comprise a curing catalyst for enhancing the polymerization of the organic composition. The use of such a curing catalyst facilitates the curing of the uncured underlayer.

The organic composition is not particularly limited as long as the composition has satisfactory adhesion to the resinous base and can impart a higher hardness to the underlayer than that of the resinous base. Such organic compositions include, but are not limited to, polymerizable and curable acrylic compositions.

Such a polymerizable and curable acrylic composition has a high affinity to the resinous base owing to its acrylic component, and, because it forms a highly crosslinked structure through polymerization, has satisfactory adhesion to the resinous base and becomes satisfactorily resistant to abrasion. Accordingly, use of a polymerizable and curable acrylic composition as the organic composition is desirable. In this case, an underlayer having a satisfactory abrasion resistance may be obtained by forming an uncured underlayer containing a polymerizable and curable acrylic composition and then polymerizing the uncured underlayer.

The preferred acrylic composition is exemplified as follows:

- Acrylic ester: 10 to 40% by weight;
- Photoinitiator for ultraviolet curing: 0.01 to 5% by weight; and
- Solvent such as propylene glycol, monomethyl ether and the like: 60 to 90% by weight.

The above-prepared underlayer has a lower hardness than the above mentioned intermediate layer composed of a polymerizable and curable silicone composition, but higher than, for example, a polycarbonate. Accordingly, when a polycarbonate base is employed as the resinous base, use of a polymerizable and curable acrylic composition as the organic composition is particularly effective.

In this connection, if the underlayer does not have a sufficiently higher hardness than the resinous base, the difference in hardness between the underlayer and the intermediate layer cannot be significantly decreased, and cracks might be formed in the intermediate layer. If such cracking occurs, the adhesion between the intermediate layer and the underlayer deteriorates to cause delamination of these layers. As a result, a photocatalytic film having a satisfactory abrasion resistance cannot be satisfactorily obtained.

Particularly, when an underlayer having a hardness between that of the intermediate layer and that of the resinous base is formed, the hardness sequentially increases in the order of the resinous base, the underlayer, and the intermediate layer in the resulting photocatalytic film, and both the differences in hardness between the resinous base and the underlayer and between the underlayer and the intermediate layer can be satisfactorily decreased. A photocatalytic film having a satisfactory abrasion resistance can therefore be easily obtained, in which the resinous base is sufficiently adhered to the underlayer and the underlayer is sufficiently adhered to the intermediate layer.

The use of the polymerizable and curable acrylic composition can easily provide an underlayer having a satisfactorily higher hardness than the resinous base.

The type of polymerizable and curable acrylic composition to be used is not critical as long as the composition is polymerizable and curable by a certain process. Such polymerizable and curable acrylic compositions include, but are not limited to, ultraviolet polymerizable and curable acrylic compositions which are polymerized by the action of ultraviolet radiation, thermally polymerizable and curable acrylic compositions which are polymerizable by heat, and electron beam polymerizable and curable acrylic compositions which are polymerized by the action of electron beams. Among these, use of an ultraviolet-induced polymerizable and curable acrylic composition can easily yield an underlayer having a hardness sufficiently higher than that of the resinous base without damaging the resinous base. Alternatively, polymerizable and curable phosphazene compositions such as PPZ (a product of Idemitsu Petrochemical Co., Ltd., Japan) and the like can also be employed.

Alternatively, inorganic-organic hybrid materials such as Si-polymerizable and curable acrylic compositions can be used as the organic composition. Specifically, ultraviolet-curable hard coating compositions such as Z7503 (a product of JSR, Japan) composed of inorganic particles and a photopolymerizable organic component bonded to the inorganic particle may be employed.

The uncured underlayer may preferably comprise a polysiloxane composition having a silanol group. Such polysiloxane compositions include, but are not limited to, silane coupling agents and thermally polymerizable and curable silicone compositions.

Of these silane coupling agents, those having a silanol group and at least one organic functional group selected from a methacrylic group, acrylic group, epoxy group, amino group, and vinyl group are preferred. Such silane coupling agents include, but are not limited to, silane coupling agents having a silanol group such as MSEP2HM (a product of Mitsubishi Chemical Corporation, Japan), macromolecular coupling agents such as MMCA (a product of Nippon Unicar Co., Ltd., Japan), epoxy functional silanes such as KBM-403, KBZ-402, and KBE-403 (products of Shin-Etsu Chemical Co., Ltd., Japan), acrylic functional silanes such as KBM-5102 and KBM-5103 (products of Shin-Etsu Chemical Co., Ltd., Japan), and ultraviolet-curable silicone hard coating agents such as X-12-2400 (a product of Shin-Etsu Chemical Co., Ltd., Japan). Preferred silane coupling agents each having a methacrylic group or an acrylic group are KBM-503, KBM-502, and KBE-502 (products of Shin-Etsu Chemical Co., Ltd., Japan), and preferred silane coupling agents each having a vinyl group are KBE-1003, KBM-1003, and KA-1003 (products of Shin-Etsu Chemical Co., Ltd., Japan). The organic composition may be an inorganic-organic hybrid composition having a silanol group. Such silane coupling agents may be contained in an amount of 2 to 30% by weight relative to the amount of the organic composition.

When such a polysiloxane composition having silanol groups is incorporated into the uncured underlayer, the silanol groups are located on the surface-side of the uncured underlayer. This configuration does not change even when the underlayer is cured. An uncured intermediate layer is then formed on the underlayer, and the underlayer is covered with the uncured intermediate layer via the silanol groups. When the uncured intermediate layer is cured, the silanol groups of the underlayer and silanol groups of the uncured intermediate layer are bonded through siloxane bonds formed by a dehydration bonding reaction, and the underlayer and the intermediate layer are firmly bonded with each other. The resulting photocatalytic film has further improved abrasion resistance due to further satisfactory adhesion between the underlayer and the intermediate layer.

The thickness of the underlayer should be preferably 1000 nm or more. If the thickness of the underlayer is less than 1000 nm, it is difficult to achieve satisfactory adhesion of the underlayer to the resinous base and intermediate layer.

[Intermediate Layer Forming Step]

The uncured intermediate layer may be prepared by, for example, a process of preparing a liquid or paste mixture (second mixture) containing the polymerizable and curable silicone composition, and applying the second mixture to the underlayer. The content of a hydrolyzable tetrafunctional silane derivative in the polymerizable and curable silicone composition for use in the invention is not particularly limited but is preferably more than 30% by mole based on the total mole amount of the polymerizable and curable silicone composition. A content of the hydrolyzable tetrafunctional silane derivative of 30% or less by mole is insufficient to impart a satisfactory hardness to the intermediate layer. The use of a polymerizable and curable silicone composition composed of a hydrolyzable tetrafunctional silane derivative alone is typically preferred.

The preferred silicone composition is exemplified as follows:

Hydrolyzable tetrafunctional silane derivative: 0.01 to 20% by weight;

Hydrolyzable trifunctional silane derivative: 0 to 10% by weight;

Hydrochloric acid: 0.1 to 1% by weight;

Solvent such as ethanol, isopropanol and the like: 30 to 99.99% by weight; and

Water: 0 to 50% by weight.

The second mixture may further comprise a curing catalyst for enhancing the polymerization of the polymerizable and curable silicone composition. The curing catalyst serves to increase the reaction rate of polymerization of the polymerizable and curable silicone composition and can further increase the density of polymerization reaction in the intermediate layer.

When the uncured intermediate layer is formed, the underlayer has not necessarily been cured. Specifically, the uncured intermediate layer may be formed on the uncured underlayer. In this case, the uncured underlayer and the uncured intermediate layer can be concurrently cured.

Hydrolyzable tetrafunctional silane derivatives of the formula $SiX_4$ include, for example, hydrolyzable tetrafunctional silane derivatives in which X is an alkoxy group having 1 to 8 carbon atoms or a chlorine or bromine atom. Of these silane derivatives, typically preferred are tetraethoxysilane, tetramethoxysilane, and tetrabutoxysilane. Especially, the use of hydrolyzable tetrafunctional silane derivatives, i.e., the use of thermally polymerizable and curable silicone compositions is preferred.

The uncured intermediate layer should preferably further comprise silica. Incorporating silica serves to further increase the hardness of the intermediate layer. Silica, particularly colloidal silica, may be contained in an amount of 1 to 30% by weight relative to the amount of the intermediate layer.

The thickness of the uncured intermediate layer should preferably fall in a range of from 100 to 2000 nm. A thickness of the uncured intermediate layer exceeding 2000 nm is liable to invite cracking due to shrinkage during curing to thereby deteriorate the abrasion resistance. In contrast, a thickness of the uncured intermediate layer of less than 100 nm may inhibit uniform film formation thereby deteriorating the abrasion resistance. Particularly, when an alkali treatment is performed as described below, the film is etched with an alkali solution, and the uniformity of the film is deteriorated to thereby decrease the abrasion resistance.

[Photocatalytic Layer Forming Step]

The photocatalytic layer may be prepared by, for example, a process of preparing a third mixture containing a photocatalyst and a binder, and applying the third mixture to the intermediate layer. The third mixture may further comprise a catalyst for enhancing the binding rate of the binder to the photocatalyst and intermediate layer.

Known photocatalysts may be used as the photocatalyst having photocatalytic activity. Such photocatalysts include, but are not limited to, $TiO_2$, $ZnO$, $SnO_2$, $SrTiO_3$, $WO_3$, $Bi_2O_3$, $Fe_2O_3$, and other metal oxides. Of these photocatalysts, $TiO_2$ (titania) has a satisfactory photocatalytic activity, is non-toxic to the living body and is chemically stable, and therefore is most advantageously used as the photocatalyst. The abrasion resistance can be maintained by decreasing the thickness of the photocatalytic layer, even if the photocatalytic does not have a significantly high hardness. In this case, the resulting photocatalytic film is affected by the underlayer and intermediate layer, particularly by the intermediate layer. Specifically, if the intermediate layer has a satisfactorily high hardness, the photocatalytic film can provide a satisfactory abrasion resistance.

The use of a polymerizable and curable silicone composition as the binder can increase the hardness of the photocatalytic layer itself to thereby improve the abrasion resistance of the photocatalytic film.

The thickness of the photocatalytic layer preferably does not exceed 1000 nm. A thickness of the photocatalytic layer exceeding 1000 nm may invite interference or whitening. Particularly, when titania is used as the photocatalyst, interference or whitening is liable to occur, as the titania has a high refractive index.

According to the invention, the surface of the intermediate layer is preferably subjected to hydrophilization prior to the formation of the photocatalytic layer. The hydrophilization treatment of the surface of the intermediate layer allows the metal oxide serving as the photocatalyst, such as titania, in the photocatalytic layer to bond to the intermediate layer to thereby exhibit a high durability. The hydrophilization can be performed by, for example, a treatment with an alkali solution, or a treatment with plasma.

According to conventional processes for forming a photocatalytic film, an underlayer is deteriorated with an acid. Therefore, an intermediate layer has been formed by preparing a mixture containing a polymerizable and curable silicone composition of a weak acidity of pH about 5 to 6, applying the mixture to the underlayer to form an uncured intermediate layer, and polymerizing the polymerizable and curable silicone composition in the uncured intermediate layer to yield an intermediate layer.

In contrast, according to the present invention, the polymerizable and curable silicone composition should preferably further comprise a strong acid. The strong acid in this embodiment can improve storage stability of the polymerizable and curable silicone composition. With this configuration, large amounts of the polymerizable and curable silicone composition can be prepared in advance and the intermediate layer with a high hardness can be stably formed even when the composition is used over a long period of time. When the polymerizable and curable silicone composition is prepared in such large amounts, the costs for preparing the composition can be reduced to thereby reduce the cost of forming the photocatalytic film.

However, in this configuration, the underlayer should preferably be resistant to strong acids at least on the surface thereof. For example, such an underlayer can be prepared by forming an uncured underlayer containing an acid resistant organic composition on the surface of the resinous base, and curing the uncured underlayer.

The aforementioned underlayer, which is obtained by forming an uncured underlayer containing a polymerizable and curable acrylic composition and polymerizing the polymerizable and curable acrylic composition in the uncured underlayer to cure the uncured underlayer, is found to be satisfactorily resistant to acids. The thus-prepared underlayer is resistant to deterioration even when the mixture containing the polymerizable and curable silicone composition is strongly acidic. To verify this fact, a mixture containing a strongly acidic polymerizable and curable silicone composition of about pH 1 was prepared, and the mixture was applied to the underlayer to form an uncured intermediate layer. As a result, the underlayer was found to be undeteriorated even by action of the strongly acidic mixture.

The intermediate layer obtained by the polymerization of the polymerizable and curable silicone composition in the uncured intermediate layer is believed to have a denser structure than conventional equivalents. This is probably because the reactivity in the polymerization of the polymerizable and curable silicone composition is increased by action of the strong acid and the reaction rate of the polymerization is therefore increased to increase the density of the resulting structure.

According to this embodiment, the intermediate layer is formed by forming an uncured intermediate layer containing the polymerizable and curable silicone composition and a strong acid, and polymerizing the polymerizable and curable silicone composition in the uncured intermediate layer. The present embodiment can therefore provide an intermediate layer having a denser structure than conventional. Generally, the hardness of a resinous base increases as the density of the structure (thereof) increases. Hence, the intermediate layer formed according to the process of the present invention is believed to have a higher hardness than conventional equivalents.

The underlayer obtained from an acid resistant organic composition is organic and therefore has a satisfactory adhesion to the resinous base. In addition, the underlayer is stable with acids and is resistant to deterioration by the uncured intermediate layer containing a strong acid. Accordingly, the adhesion between the underlayer and the uncured intermediate layer cannot be significantly deteriorated during formation of the intermediate layer, and the adhesion can be maintained even after the formation of the intermediate layer through curing of the uncured intermediate layer.

Strong acids for use in the invention include, but are not limited to, hydrochloric acid, nitric acid, and sulfuric acid. However, the strong acid must not deteriorate the polymerizable and curable silicone composition.

The acidity (pH) of the uncured intermediate layer is not particularly limited but is preferably as low as possible according to the degree of acid resistance of the acid resistant organic composition for use in the underlayer. This configuration can further improve the storage stability of the polymerizable and curable silicone composition. In addition, further improvement of the density of the structure of the intermediate layer can be expected.

Particularly, when a polymerizable and curable acrylic composition is employed as the acid resistant organic composition, an uncured intermediate layer having an acidity of pH 1 can be formed. It is thought that this type of uncured intermediate layer can provide an intermediate layer having a highly dense structure and that an intermediate layer having a hardness higher than that of conventional can be obtained.

Acid resistant organic compositions for use in the invention are not restricted as long as they are organic compositions having a satisfactory adhesion to the resinous base and are resistant to a strong acid in the intermediate layer. Organic polymerizable and curable compositions that are highly resistant to acids and to abrasion are advantageously employed. The underlayer formed from this type of organic polymerizable and curable composition can further improve the abrasion resistance of the photocatalytic film. Such organic polymerizable and curable compositions having satisfactory acid resistance and abrasion resistance include, for example, the aforementioned polymerizable and curable acrylic compositions.

Of these compositions, polymerizable and curable acrylic compositions can form a highly crosslinked structure through polymerization and have a satisfactory acid resistance, and are preferably employed as the acid resistant organic composition. In this configuration, the underlayer having a satisfactory acid resistance can be obtained by forming an uncured underlayer containing the polymerizable and curable acrylic composition and polymerizing the uncured underlayer.

EXAMPLES

The present invention will now be illustrated below in further detail with reference to several examples of the present invention and comparative examples, which are not intended to limit the scope of the invention.

Example 1

A three-layer photocatalytic film composed of an underlayer, an intermediate layer, and a photocatalytic layer was prepared according to the procedure shown in FIG. 1.

[Underlayer Forming Step]

An underlayer was formed in the following manner. Three pieces of a resin base 1 (100 mm×100 mm×4 mm) made of a polycarbonate (Iupilon (trade mark), a product of Mitsubishi Engineering-Plastics Corporation, Japan) were used as the resinous base.

Separately, a first mixture was prepared by mixing 100 parts by weight, on the basis of solid content basis, of an acrylic ultraviolet-induced polymerizable and curable composition (NSC-EX-2020, a product of Nippon Fine Chemical Co., Ltd., Japan) and 20 parts by weight of a silane coupling agent (MSEP2HM, a product of Mitsubishi Chemical Corporation, Japan) as a polysiloxane composition having a silanol group. The resin bases were previously cleaned with isopropyl alcohol (IPA), and the above-prepared first mixture was applied to the surface of each of the resin bases by flow coating to form an uncured underlayer 2*a*. Each uncured underlayer 2*a* had a thickness of 2000 nm.

Each uncured underlayer 2*a* was dried at 80° C. for 5 minutes to remove solvent in the uncured underlayer 2*a*. Using an ultraviolet irradiator with two parallel ultraviolet lamps that was capable of irradiating ultraviolet rays of 80 W/cm to a predetermined position, each of the uncured underlayers 2*a* was conveyed through the predetermined position at a speed of 1.5 m/minute. By irradiating the uncured underlayer 2*a* with ultraviolet rays in this manner, the polymerizable and curable acrylic composition in the uncured underlayer 2*a* was polymerized to yield an underlayer 2.

[Intermediate Layer Forming Step]

By using tetraethoxysilane alone as a thermally polmerizable and curable silicone composition, a second mixture #1 containing the thermally polymerizable and curable silicone composition was prepared in the following manner.

In a vessel was placed 22 parts by weight of an aqueous solution containing 0.1 N hydrochloric acid, and the solution was sufficiently stirred while maintaining the temperature of the solution at 10° C. or lower. To this aquous solution was added 50 parts by weight of tetraethoxysilane (a product of Kanto Kagaku Co., Ltd., Japan) and the resulting mixture was stirred for 3 hours while maintaining the temperature of the mixture at 10° C. The prepared solution #1 containing tetraethoxysilane was heat ed to a temperature of 20° C. and 15 parts by weight of IPA was added to the heated solution to yield a second mixture #1.

The second mixture #1 gells within several hours after the pH exceeds 3. Therefore, hydrochloric acid was used to give the mixture a pH of 3 or less to thereby improve the storage stability of the second mixture. The content of IPA was chosen within a range such that the pH of the resulting mixture did not exceed 3.

The second mixture #1 was applied to each of the above-prepared underlayers 2 by flow coating to form an uncured intermediate layer 3*a*. Each uncured intermediate layer 3*a* had a thickness of 500 nm.

The uncured intermediate layer 3*a* was then heated at 120° C. for 1 hour to polymerize the thermally polymerizable and curable silicone composition in the uncured intermediate layer 3*a* to thereby yield an intermediate layer 3.

[Phctocatalytic Layer Forming Step]

The surface of each of the above-prepared intermediate layers 3 was subjected to hydrophilization with an alkali treating solution. In this procedure, an aqueous solution containing 0.1 N NaOH was used as the alkali treating solution. A sample having the above-prepared intermediate layer was dipped in the alkali treating solution for 3 minutes to treat the surface of the intermediate layer with an alkali. After the alkali treatment, the sample was rinsed with water and was then dried at 80° C. for 5 minutes.

Separately, a third mixture was prepared by mixing a titania sol (an aqueous dispersion of $TiO_2$, including STS-02 manufactured by Ishihara Sangyo Kaisha Ltd., Japan as the $TiO_2$), a binder (polymerizable and curable silicone composition; the solution #1 used in the preparation of the second mixture #1), and a dispersion medium (a solution mixture composed of 60% by volume of water and 40% by volume of IPA based on the total volume of dispersion medium). In this example, three types of third mixtures were prepared (#1-1, #1-2, and #1-3 each containing the titania and binder in weight ratios of the titania to the binder of 4:1, 1:1, and 1:4, respectively).

Each of the third mixtures was applied to the surface of a respective hydrophilized intermediate layer 3 by spin coating at a spinning rate of 2000 rpm to form an uncured photocatalytic layer 4*a* having a thickness of 100 nm.

Each of the above-prepared uncured photocatalytic layers 4*a* was heated at 120° C. for 60 minutes to polymerize the thermally polymerizable and curable silicone composition in the uncured photocatalytic layer 4*a* to thereby yield a photocatalytic layer 4.

Thus, three types of photocatalytic films were prepared by changing the ratio of the titania sol to the binder in the formation of the photocatalytic layer 4, i.e., in the preparation of the third mixture. The abrasion resistance of these photocatalytic films was determined under the following conditions.

(1) Abrasion Resistance

Using a Taber type abrasion tester (5130 ABRASER, a product of TELEDYNETABE) with a wheel of CS10F under a load of 500 g, a sample was subjected to an abrasion test, and the change of haze (ΔH (%)) after a 500-cycle test was determined with a haze meter (HGM-3DP, a product of Suga Test Instruments, Japan). The determination of haze change was performed two times.

The results are shown in Table 1 below. The ratio in the parenthesis in the column of the third mixture is a weight ratio of the titania to the binder.

TABLE 1

| Third Mixture Used | Haze Change ΔH (%) |
|---|---|
| #1-1 (4:1) | 2.7 |
| #1-2 (1:1) | 2.8 |
| #1-3 (1:4) | 2.6 |

Table 1 shows that each of the three photocatalytic films showed a markedly small haze change and had satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than that of conventional.

The haze changes of the three photocatalytic films according to this example did not significantly differ, indicating that the ratio of the titania to the binder in the preparation of the third mixture does not significantly affect the abrasion resistance of the resulting photocatalytic film. The photocatalytic layer in each of the three photocatalytic films had a markedly small thickness and was thought not to be significantly involved in he improvement of hardness of the photocatalytic film. This shows that the abrasion resistance of the photocatalytic film is largely affected by the hardness of the underlayer and the intermediate layer, and is particularly largely affected by the hardness of the intermediate layer.

Example 2

A series of photocatalytic films was prepared in the same manner as in Example 1, except that the following mixtures were respectively employed as the second mixture for use in the intermediate layer forming step and as the third mixture for use in the photocatalytic layer forming step, and that a uncured photocatalytic layer was formed by flow coating or by spin coating.

As the second mixture containing a thermally polymerizable and curable silicone composition, a second mixture #2 comprising the second mixture #1 with colloidal silica was prepared. Specifically, the second mixture #2 was obtained by adding 25 parts by weight of colloidal silica to 100 parts by weight of the solution #1 to yield a solution (solution #2), and diluting the solution with IPA to ; solid content of 1% by weight. The resulting second mixture #2 had an acidity of pH 3 or lower.

Separately, a series of the third mixture was prepared by mixing a titania sol (an aqueous dispersion of $TiO_2$, M-6 manufactured by Taki Chemical Co., Ltd., Japan), a binder (a polymerizable and curable silicone composition; the solution #2) and a dispersion medium (a solution mixture composed of 60% by volume of water and 40% by volume of IPA based on the total volume of dispersion medium). In this example, three type s of the third mixture (#2-1, #2-1, and #2-3) having sold contents of 1% by weight, 2% by weight, and 3% weight, respectively, based on the total weight of the mixture were prepared. Each of the three third mixtures comprised the titania and the binder in equivalent ratio to each other.

Each of the above-prepared third mixtures was applied to the hydrophilized surface of the intermediate layer by flow coating or spin coating to yield an uncured photocatalytic layer. In the flow coating operation, two types of uncured photocatalytic layers were prepared by using the mixture having a solid content of 1% by weight or by using the mixture having a solid content of 2% by weight. In the spin coating operation, the mixture was applied at two different spinning rates of 2000 rpm and 4000 rpm, respectively.

A total of eight photocatalytic films were prepared by changing the solid content and application method of the third mixture in the formation of the photocatalytic layer. The abrasion resistance of each of the photocatalytic films was determined in the same manner as in Example 1. The results of the abrasion test are shown in Table 2.

TABLE 2

| | Haze Change ΔH (%) | | |
|---|---|---|---|
| Third Mixture Coating Method | Solid Content 1 wt % (#2-1) | Solid Content 2 wt % (#2-2) | Solid Content 3 wt % (#2-3) |
| Flow Coating | 1.5 | 3.2 | — |
| | 1.1 | 3.1 | |
| Spin Coating | 0.9 | 2.0 | 1.8 |
| (2000 rpm) | 1.3 | 2.2 | 2.0 |
| Spin Coating | 1.0 | 2.2 | 1.9 |
| (4000 rpm) | 1.3 | 2.0 | 2.2 |

Table 2 shows that each of the eight photocatalytic films showed a markedly small haze change and had satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than that of conventional.

However, in comparing haze changes between a photocatalytic film in which the uncured photocatalytic layer was formed by flow coating and a photocatalytic film whose uncured photocatalytic layer was formed by spin coating, the latter showed a somewhat smaller haze change than the former. In addition, the former photocatalytic firm showed some interference fringes and some defective appearance. These results show that, compared under the above conditions, the spin coating technique is superior to the flow coating technique as a technique for forming a photocatalytic layer.

The haze changes of the eight photocatalytic films according to this example did not significantly differ, regardless of the solid content of the third mixture, indicating that the solid content in the preparation of the third mixture does not significantly affect the abrasion resistance of the resulting photocatalytic film. The photocatalytic layer in each of the eight photocatalytic films had a markedly small thickness and was thought not to be significantly involved in the improvement of hardness of the photocatalytic film. This shows that the abrasion resistance of the photocatalytic film is largely affected by the hardness of the underlayer and the intermediate layer, and is particularly largely affected by the hardness of the intermediate layer.

Example 3

A series of photocatalytic films were prepared in the same manner as in Example 2, except that the uncured photocatalytic layer was formed by applying the third mixture to the intermediate layer by bar coating. In the present example, three photocatalytic films were prepared by setting the bar count at No. 002, No. 004, or No. 006. In each procedure, the coating speed was set at 3.5 cm/min. Separately, three types (#3-1, #3-2, and #3-3) of uncured photocatalytic layers were formed by changing the solid content of the third mixture to 3% by weight, 5% by weight and 7% by weight, respectively. In photocatalytic films using the third mixture #3-3, the films were prepared by using bars of a bar count No. 002 and a bar count No. 004 only.

Thus, a total of eight types of photocatalytic films were prepared by changing part of the process for the formation of the photocatalytic layer. The abrasion resistance of these photocatalytic films was determined in the same manner as in Example 1, and adhesion was measured in the following manner. By subjecting the photocatalytic films to visual inspection, the presence or absence of cracks and interference fringes was also inspected.

(2) Adhesion (according to Japanese Industrial Standards (JIS) K5400)

A photocatalytic film to be tested was cut 1 mm 10 times in the vertical and 10 times in the horizontal directions with a cutter knife to form a total of 100 cross-cut grids (each 1 $mm^2$), and a pressure sensitive adhesive tape (a cellophane tape, a product of Nichiban Co., Ltd., Japan) was brought into contact with the cross-cut area, and the adhered tape was then rapidly peeled in a direction perpendicular to the cross-cut film. The number of grids adhered to the peeled tape was counted. In this connection, the adhesion determined immediately after the preparation of the photocatalytic film was defined as the initial adhesion.

(3) Warm Water Resistance

A photocatalytic film to be tested was immersed in warm water at 40° C. for 240 hours, and was then subjected to an adhesion test under the same condition as above. The number of grids adhered to the peeled tape was counted.

The results of the abrasion test, the adhesion test and the visual inspection of the photocatalytic films are shown in Tables 3 to 5.

TABLE 3

Third Mixture #3-1 (solid content: 3 wt %)

| Bar Count | ΔH (%) | Appearance: Crack | Appearance: Interference Fringe | Adhesion: Initial | Adhesion: Warm Water Resistance |
|---|---|---|---|---|---|
| 002 | 1.5<br>1.8 | none | slightly formed | ○ | ○ |
| 004 | 2.6<br>1.5 | none | slightly formed | ○ | X |
| 006 | 2.4<br>1.8 | none | slightly formed | ○ | X |

TABLE 4

Third Mixture #3-2 (solid content: 5 wt %)

| Bar Count | ΔH (%) | Appearance: Crack | Appearance: Interference Fringe | Adhesion: Initial | Adhesion: Warm Water Resistance |
|---|---|---|---|---|---|
| 002 | 1.9<br>1.8 | none | slightly formed | ○ | ○ |
| 004 | 1.1<br>1.4 | none | formed | ○ | X |
| 006 | 1.0<br>1.3 | none | formed | ○ | X |

TABLE 5

Third Mixture #3-3 (solid content: 7 wt %)

| Bar Count | ΔH (%) | Appearance: Crack | Appearance: Interference Fringe | Adhesion: Initial | Adhesion: Warm Water Resistance |
|---|---|---|---|---|---|
| 002 | 1.3<br>1.4 | none | slightly formed | ○ | X |
| 004 | 1.3<br>1.8 | none | formed | ○ | X |

Tables 3 to 5 show that each of the eight photocatalytic films showed a markedly small haze change and had a satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than conventional.

The photocatalytic films, whose photocatalytic layers were prepared using a bar of a low bar count No. 002, showed decreased interference fringe formation regardless of the solid content of the third mixture in the range of from 3 to 7. In contrast, the photocatalytic films in which a photocatalytic layer was prepared using a bar of a high bar count No. 006 showed increased interference fringe formation with an increasing solid content of the third mixture.

These results show that in the formation of photocatalytic layers by bar coating, the use of a bar of a low bar count can inhibit the formation of interference friniges. Especially, the use of a bar of No. 002 can effectively inhibit the formation of interference fringes. The solid content of the third mixture should be preferably 5% by weight or less.

Example 4

A series of photocatalytic films were prepared in the same manner as in Example 2, except that the following mixtures were respectively employed as the second mixture for use in the intermediate layer forming step and as the third mixture for use in the photocatalytic layer forming step.

A second mixture #4-1 was prepared by diluting the solution #1 with IPA to a solid content of 1% by weight.

Separately, a third mixture #4-1 was prepared by mixing a titania sol (an aqueous dispersion of $TiO_2$, M-6 manufactured by Taki Chemical Co., Ltd., Japan), a binder (a polymerizable and curable silicone composition; the solution #1, and a dispersion medium (a solution mixture composed of 60% by volume of water and 40% by volume of IPA based on the total volume of dispersion medium). Likewise, a third mixture #4-2 was prepared in the same manner as above, except that the solution #2 was used instead of the solution #1. Each of these third mixtures comprised the titania and the binder in equivalent weight ratios and had a solid content of about 2% by weight based on the total weight of the third mixture.

Each of the above-prepared third mixtures was applied to the hydrophilized surface of the intermediate layer by spin coating to yield an uncured photocatalytic layer. In the spin coating operation, the mixture was applied at two different spinning rates of 2000 rpm and 4000 rpm, respectively.

Thus, a total of four photocatalytic films were prepared by changing the processes for the formation of intermediate layer and photocatalytic layer. The abrasion resistance of these photocatalytic films was determined in the same manner as in Example 1 and the adhesion was measured in the same manner as in Example 2. The results of the abrasion test are shown in Table 6.

TABLE 6

| Third Mixture | #4-1 | | #4-2 | |
|---|---|---|---|---|
| Spinning Rate (rpm) | 2000 | 4000 | 2000 | 4000 |
| Haze Change<br>ΔH (%) | 3.7<br>3.2 | 2.9<br>3.2 | 2.0<br>2.2 | 2.2<br>2.0 |

Table 6 shows that each of the four photocatalytic films showed a markedly small haze change and had satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than that of conventional.

The photocatalytic layer in each of the four photocatalytic films had a markedly small thickness and was thought not to be significantly involved in improving the hardness of the photocatalytic film. This shows that the abrasion resistance of the photocatalytic film is greatly affected by the hardness of the underlayer and the intermediate layer, and is particularly greatly affected by the hardness of the intermediate layer.

In addition, the photocatalytic films according to this example showed satisfactory initial adhesion and adhesion in warm water (warm water resistance).

Example 5

A series of photocatalytic films were prepared in the same manner as in Example 4, except that the surface of the intermediate layer was subjected to hydrophilization with plasma in the following manner.

Specifically, the surface of the intermediate layer was exposed twice to plasma at a rate of 3 m/minute. The plasma was induced by corona discharge at an output of 300 W.

Thus, a total of four photocatalytic films were prepared by changing part of the process for the formation of the photocatalytic layer. The abrasion and the adhesion of these photocatalytic films were determined in the same manner as in Example 1 and in Example 2, respectively. The results of the abrasion test are shown in Table 7.

TABLE 7

| Third Mixture | #4-1 | | #4-2 | |
|---|---|---|---|---|
| Spinning Rate (rpm) | 2000 | 4000 | 2000 | 4000 |
| Haze Change<br>ΔH (%) | 1.7<br>2.3 | 2.2<br>2.2 | 2.2<br>2.3 | 1.9<br>2.2 |

Table 7 shows that each of the four photocatalytic films showed a markedly small haze change and had a satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than that of conventional.

The photocatalytic layer in each of the four photocatalytic films had a markedly small thickness and was thought not to be significantly involved in improving the hardness of the photocatalytic film. This shows that the abrasion resistance of the photocatalytic film is greatly affected by the hardness of the underlayer and the intermediate layer, and is particularly greatly affected by the hardness of the intermediate layer.

In addition, no significant change due to difference in spinning rate was observed.

The photocatalytic films according to this example showed satisfactory initial adhesion and adhesion in warm water.

Example 6

A series of photocatalytic films were prepared in the same manner as in Example 2, except that photocatalyst layers were formed in the following manner.

A third mixture was prepared by mixing a titania sol (ax aqueous dispersion of $TiO_2$, M-10 manufactured by Taki Chemical Co., Ltd., Japan), a binder (a polymerizable and curable silicone composition; the solution #2), and a dispersion medium (a solution mixture composed of 60% by volume of water and 40% by volume of IPA based on the total volume of dispersion medium). The third mixture comprised the titania and the binder in an equivalent weight ratio and has a solid content of about 10% by weight based on the total weight of the third mixture.

The above-prepared third mixture was applied to the hydrophilized surface of the intermediate layer by spin coating at a spinning rate of 4000 rpm to form an uncured photocatalytic layer. In the present example, a total of for uncured photocatalytic layers were prepared with thickness thereof set at 27 nm, 35 nm, 43 nm and 55 nm, respectively.

Each of the above-prepared uncured photocatalytic layers was heated at 120° C. for 60 minutes to polymerize the thermally polymerizable and curable silicone composition in the uncured photocatalytic layer to thereby yield a photocatalytic layer.

Thus, a total of four photocatalytic films having photocatalytic layers with different thicknesses were prepared. The abrasion resistance and the adhesion of these photocatalytic films were determined in the same manners as in Example 1 and in Example 2, respectively. Separately, the photocatalytic films were subjected to visual inspection to examine the absence or presence of cracks and interference fringes. Cracking was examined immediately after preparation of the photocatalytic film (initial) and after immersion in warm water at 40° C. for 240 hours (warm water resistance). The results are shown in Table 8.

TABLE 8

| Thickness of Photo-catalytic Layer (nm) | ΔH (%) | Appearance | | | Adhesion | |
|---|---|---|---|---|---|---|
| | | Crack | | Interference Fringe | | |
| | | Initial | Warm Water Resistance | | Initial | Warm Water Resistance |
| 27 | 1.8<br>1.6 | none | none | slightly formed | 0 | 0 |
| 35 | 2.2<br>1.7 | none | none | slightly formed | 0 | 0 |
| 43 | 1.9<br>1.2 | none | none | slightly formed | 0 | 0 |
| 55 | 1.9<br>0.7 | none | none | formed | 0 | X |

Table 8 shows that each of the four photocatalytic films showed a markedly small haze change and had satisfactory abrasion resistance. In addition, the haze change of each of these photocatalytic films was smaller than the haze change (5.5) of a photocatalytic film according to Comparative Example 3 mentioned below. These results show that the process of the present invention can easily provide a photocatalytic film having an abrasion resistance higher than that of conventional.

The photocatalytic films in which the photocatalytic layer had a thickness of from 27 to 43 nm showed satisfactory abrasion resistance and adhesion and exhibited no crack and interference fringe. In contrast, the photocatalytic film whose photocatalytic layer had a thickness of 55 nm showed satisfactory abrasion resistance and initial adhesion, but had a somewhat low warm water resistance and exhibited some interference fringes. These results show that the thickness of the photocatalytic layer should be preferably less than 55 nm.

Comparative Example 1

An underlayer was formed on a resinous base in the following manner, and a photocatalytic layer was then formed directly on the underlayer without forming an intermediate layer.

As the resinous base, the same resin base used in Example 1 was employed. A curable composition (LAC PR-04, a pro duct of Sakai Chemical Industry Co., Ltd., Japan) was used as a mixture for the formation of underlayer. This mixture had a solid content of 8% by weight based on the total 1 weight of the mixture. The surface of the resin base was cleaned with IPA, and the mixture was applied to the cleaned surface of the resin base by flow coating to yield an uncured underlayer having a thickness of 2000 nm.

Separately, a mixture was prepared by mixing 1 part by volume of a main agent containing titania (LAC TI-03-A, a product of Sakai Chemical Industry Co., Ltd., Japan) and 1 part by volume of a curing agent containing a polymerizable and curable silicone composition (LAC TI-03-B, a product of Sakai Chemical Industry Co., Ltd., Japan). The resulting mixture had a solid content of 5% by weight based on the total weight of the mixture. Another mixture having a solid content of 2% by weight was prepared by diluting the above-prepared mixture with a diluent (a mixture of 50% by weight of water, 25% by weight of ethanol and 25% by weight of IPA based on the total weight of the mixture). Each of these mixtures was applied to the underlayer by spin coating to yield an uncured photocatalytic layer.

Each uncured photocatalytic layer was heated at 120° C. for 1 hour to polymerize the thermally polymerizable and curable silicone composition in the uncured photocatalytic layer to thereby yield a photocatalytic layer.

Thus, two types of two-layer photocatalytic films composed of an underlayer and a photocatalytic layer were prepared by changing part of the process for the formation of the photocatalytic layer. The abrasion resistance of these photocatalytic films was determined in the same manner as in Example 1.

The photocatalytic film with the photocatalytic layer formed from the mixture having a solid content of 2% by weigh showed a high haze change of 29.6. The photocatalytic film with the photocatalytic layer formed from the mixture having a solid content of 5% by weight showed a higher haze change of 32.0. These results show that the process for forming a photocatalytic film according to this comparative example cannot sufficiently provide a photocatalytic film having a satisfactory abrasion resistance.

Comparative Example 2

An underlayer was formed on a resinous base in the following manner, and a photocatalytic layer was then formed directly on the underlayer without forming an intermediate layer.

As the resinous base, the same resin base used in Example 1 was employed. A Primer A (a product of Ishihara Sangyo Kaisha, Ltd., Japan) was used for forming the underlayer. This solution had a solid content of 3% by weight based on the total weight of the solution. The surface of the resin base was cleaned with IPA, and the solution was applied to the cleaned surface of the resin base by flow coating to yield an uncured underlayer having a thickness of 1000 nm.

The uncured underlayer was heated at 80° C. for 30 minutes to remove the solvent in the uncured underlayer and to polymerize a polymerizable and curable acrylic composition in the uncured underlayer. Thus, an underlayer was formed.

A mixture containing titania (ST-K03, a product of Ishihira Sangyo Kaisha, Ltd., Japan) having a solid content of 10% by weight based on the total weight of the mixture was employed for the formation of photocatalytic layer. Another mixture having a solid content of 2% by weight was prepared by diluting the mixture ST-K03 with a diluent (a mixture of 60% by weight of water, and 40% by weight of IPA based on the total weight of the mixture). Each of these mixtures was applied to the underlayer by spin coating to yield an uncured photocatalytic layer.

Each uncured photocatalytic layer was heated at 120° C. for 1 hour to polymerize the thermally polymerizable and curable silicone composition in the uncured photocatalytic layer to thereby yield a photocatalytic layer.

Thus, two types of two-layer photocatalytic films composed of an underlayer and a photocatalytic layer were prepared by changing part of the process for the formation of photocatalytic layer. On these photocatalytic films, the abrasion resistance was determined in the same manner as in Example 1.

The photocatalytic film with photocatalytic layer formed from the mixture having a solid content of 2% by weight showed a high haze change of 39.7. The photocatalytic film with photocatalytic layer formed from the mixture having a solid content of 3% by weight showed a high haze change of 39.4. These results show that the process for the formation of a photocatalytic film according to this comparative example cannot form a photocatalytic film having a satisfactory abrasion resistance.

Comparative Example 3

A hard-coated polycarbonate sheet (Iupilon Sheet (trade mark) MR05, a product of Mitsubishi Engineering-Plastics Corporation, Japan) was used. This polycarbonate sheet had a preliminary formed underlayer (primer layer) and a silicone hardcoat layer. A photocatalytic layer was formed on the silicone hardcoat layer in the same manner as in Comparative Example 2.

In the above procedure, prior to the formation of photocatalytic layer, the silicone hardcoat layer was subjected to hydrophilization with plasma in the same manner as in Example 4. A mixture containing titania for use in the formation of photocatalytic layer was prepared by diluting CZP-221 (a product of Taki Chemical Co., Ltd., Japan) with the aforementioned diluent to a solid content of 2% by weight.

The abrasion resistance of the above-prepared photocatalytic film was determined in the same manner as in Example 1.

The photocatalytic film according to this comparative example showed a low haze change of 5.5. The result shows that the process for the formation of a photocatalytic film according to this comparative example can provide a photocatalytic film having a high abrasion resistance. However, the abrasion resistance is still inferior to those of the photocatalytic films obtained by the processes according to the examples of the present invention.

Other embodiments and variations will be obvious to those skilled in the art, and the present invention is not to be limited to the specific matters stated above.

What is claimed is:

1. A process for forming a photocatalytic film, said process comprising:

an underlayer forming step for forming an uncured underlayer from a polymerizable and curable acrylic composition on a surface of a resinous base, wherein said polymerizable and curable acrylic composition is an ultraviolet polymerizable and curable acrylic composition which is polymerizable by ultraviolet radiation, and polymerizing said polymerizable and curable acrylic composition to convert said uncured underlayer into an underlayer having a hardness higher than that of said resinous base;

an intermediate layer forming step for forming an uncured intermediate layer from a polymerizable and curable silicone composition on said uncured underlayer or on said underlayer to yield an uncured intermediate layer, and polymerizing said polymerizable and curable silicone composition to convert said uncured intermediate layer into an intermediate layer, said polymerizable and curable silicone composition being prepared mainly from a hydrolyzable tetrafunctional silane derivative, wherein the amount of said hydrolyzable tetrafunctional silane derivative in said polymerizable and curable silicone composition is more than 30% by mole based on the total mole amount of said polymerizable and curable silicone composition; and a photocatalytic layer forming step for forming a photocatalytic layer comprising a photocatalyst on said intermediate layer.

2. A process according to claim 1, wherein said uncured underlayer comprises a polysiloxane composition having a silanol group.

3. A process according to claim 1, wherein said polymerizable and curable silicone composition is a thermally polymerizable and curable silicone composition which is polymerizable by heat.

4. A process according to claim 1, wherein said polymerizable and curable silicone composition comprises a strong acid.

5. A process according to claim 1, wherein said photocatalytic layer is formed after subjecting a surface of said intermediate layer to hydrophilization treatment.

* * * * *

UNITED STATES PATENT AND TRADEMARK OFFICE

CERTIFICATE OF CORRECTION

PATENT NO. : 6,465,388 B1
DATED : October 15, 2002
INVENTOR(S) : Hozumi et al.

It is certified that error appears in the above-identified patent and that said Letters Patent is hereby corrected as shown below:

Column 10,
Line 3, delete "[Phctocatalytic" and insert therefore -- [Photocatalytic --;

Column 11,
Line 8, delete "involved in he" and insert therefore -- involved in the --;
Line 33, delete "IPA to ; solid" and insert therefore -- IPA to a solid --;
Line 45, delete "three type s" and insert therefore -- three types --;
Line 46, delete "having sold" and insert therefore -- having solid --;

Column 14,
Lines 35-36, delete "solution #1," and insert therefore -- solution #1), --;

Column 16,
Line 1, delete "sol (ax" and insert therefore -- sol (an --;
Line 14, delete "of for" and insert therefore -- of four --;

Column 17,
Line 42, delete "weigh showed" and insert therefore -- weight showed --.

Signed and Sealed this

First Day of April, 2003

JAMES E. ROGAN
*Director of the United States Patent and Trademark Office*